United States Patent
Fernandez et al.

(10) Patent No.: US 9,940,686 B2
(45) Date of Patent: *Apr. 10, 2018

(54) EXPLOITING FRAME TO FRAME COHERENCY IN A SORT-MIDDLE ARCHITECTURE

(71) Applicant: Intel Corporation, Santa Clara, CA (US)

(72) Inventors: Juan Fernandez, Barcelona (ES); Javier Carretero Casado, Barcelona (ES); Pedro Marcuello, Barcelona (ES); Tomas G. Akenine-Moller, Lund (SE)

(73) Assignee: Intel Corporation, Santa Clara, CA (US)

( * ) Notice: Subject to any disclaimer, the term of this patent is extended or adjusted under 35 U.S.C. 154(b) by 79 days.

This patent is subject to a terminal disclaimer.

(21) Appl. No.: 14/277,239

(22) Filed: May 14, 2014

(65) Prior Publication Data

US 2015/0332429 A1 Nov. 19, 2015

(51) Int. Cl.
*G06T 1/60* (2006.01)
*G06T 1/20* (2006.01)
(Continued)

(52) U.S. Cl.
CPC .................. *G06T 1/20* (2013.01); *G06T 1/60* (2013.01); *G06T 15/005* (2013.01); *G06T 17/10* (2013.01);
(Continued)

(58) Field of Classification Search
None
See application file for complete search history.

(56) References Cited

U.S. PATENT DOCUMENTS 7,692,642 B2   4/2010  Wyatt
7,702,683 B1 *  4/2010  Kirshenbaum ... G06F 17/30109
                                                    707/718
(Continued)

FOREIGN PATENT DOCUMENTS

GB   0916924.4   9/2009
GB   1014602.5   9/2010
(Continued)

OTHER PUBLICATIONS

"The ryg blog", "Optimizing the basic rasterizer", https://fgiesen.wordpress.com/2013/02/10/optimizing-the-basic-rasterizer, [online], [retrieved Dec. 25, 2015], Feb 10, 2013.*
(Continued)

*Primary Examiner* — Ulka Chauhan
*Assistant Examiner* — Patrick F Valdez
(74) *Attorney, Agent, or Firm* — Trop Pruner & Hu, P.C.

(57) ABSTRACT

Pixel values that were computed in a previous frame may be reused for the current frame, operating in a sort-middle architecture. A hash or some other compact representation of all the data used in a tile, including all triangles, uniforms, textures, shaders, etc. is computed and stored for each tile. When rendering the next frame, that compact representation is once again computed for each tile. In a sort-middle architecture, there is a natural break point just before rasterization. At this break point, the compact representation may be compared to the compact representation computed in the previous frame for the same tile. If those compact representations are the same, then there is no need to render anything for this tile. Instead, the contents of the color buffer or other buffers of the previous frame of the tile may be moved to the same buffer of the tile for the current frame.

32 Claims, 4 Drawing Sheets

(51) Int. Cl.
  *G09G 5/36* (2006.01)
  *G06T 15/00* (2011.01)
  *G06T 17/10* (2006.01)

(52) U.S. Cl.
  CPC .......... *G09G 5/363* (2013.01); *G06T 2200/28* (2013.01); *G09G 2330/021* (2013.01); *G09G 2360/122* (2013.01)

(56) References Cited

U.S. PATENT DOCUMENTS

| | | | |
|---|---|---|---|
| 7,743,013 B2* | 6/2010 | Mityagin | G06F 17/30011 |
| 7,804,449 B2 | 9/2010 | Molnar | |
| 8,004,521 B2 | 8/2011 | Falchetto | |
| 8,108,931 B1 | 1/2012 | Witten et al. | |
| 8,134,934 B2 | 3/2012 | Chen et al. | |
| 8,711,163 B2 | 4/2014 | Schardt et al. | |
| 8,970,580 B2 | 3/2015 | Jang et al. | |
| 8,988,443 B2 | 3/2015 | Croxford et al. | |
| 9,305,326 B2 | 4/2016 | Hwang et al. | |
| 2006/0146056 A1 | 7/2006 | Wyatt | |
| 2008/0150950 A1* | 6/2008 | Sorgard | G06T 15/005 345/522 |
| 2008/0170066 A1* | 7/2008 | Falchetto | G06T 15/40 345/419 |
| 2009/0046098 A1* | 2/2009 | Barone | G06T 11/40 345/420 |
| 2010/0057618 A1 | 3/2010 | Spicer et al. | |
| 2011/0069632 A1* | 3/2011 | Chen | H04L 43/026 370/253 |
| 2011/0074765 A1* | 3/2011 | Oterhals | G06T 11/40 345/418 |
| 2011/0074800 A1* | 3/2011 | Stevens | G06T 11/40 345/545 |
| 2011/0080419 A1 | 4/2011 | Croxford | |
| 2011/0102446 A1 | 5/2011 | Oterhals | |
| 2011/0199377 A1* | 8/2011 | Jang | G06T 15/005 345/426 |
| 2011/0252046 A1 | 10/2011 | Szabo | |
| 2012/0176364 A1 | 7/2012 | Schardt | |
| 2012/0176386 A1* | 7/2012 | Hutchins | G06T 1/20 345/522 |
| 2012/0268480 A1* | 10/2012 | Cooksey | G06T 1/60 345/619 |
| 2013/0120380 A1 | 5/2013 | Kallio | |
| 2013/0120439 A1* | 5/2013 | Harris | G11B 27/034 345/619 |
| 2013/0201124 A1 | 8/2013 | Choi et al. | |
| 2013/0271465 A1 | 10/2013 | Clarberg et al. | |
| 2013/0314429 A1 | 11/2013 | Croxford et al. | |
| 2014/0032848 A1 | 1/2014 | Zhau | |
| 2014/0063030 A1* | 3/2014 | Metcalfe | G06T 1/60 345/531 |
| 2014/0139534 A1* | 5/2014 | Tapply | G06T 15/005 345/522 |
| 2014/0184597 A1* | 7/2014 | Clarberg | G06T 15/005 345/423 |
| 2014/0229790 A1 | 8/2014 | Goss et al. | |
| 2014/0347357 A1* | 11/2014 | Kim | G06T 15/005 345/420 |
| 2014/0354664 A1* | 12/2014 | Brown | G09G 5/363 345/545 |
| 2015/0091892 A1* | 4/2015 | Kwon | G06T 15/005 345/419 |
| 2015/0097857 A1* | 4/2015 | Akenine-Moller | G06T 11/40 345/619 |
| 2015/0187123 A1* | 7/2015 | Hwang | G06T 1/20 345/421 |

FOREIGN PATENT DOCUMENTS

| | | |
|---|---|---|
| GB | 2474114 A | 4/2011 |
| JP | 2005514711 A | 5/2005 |
| JP | 2009181582 A | 8/2009 |
| JP | 2011070672 | 4/2011 |
| JP | 05354507 | 11/2013 |
| TW | I278788 B | 4/2007 |

OTHER PUBLICATIONS

Bloom, B. H., "Space/Time Trade-Offs in Hash Coding with Allowable Errors," Communications of the ACM, Jul. 1970, vol. 13, No. 7, pp. 422-426 (5 page).
Molnar, S. et al., "A Sorting Classification of Parallel Rendering," IEEE Computer Graphics and Applications, Jul. 1994, vol. 14, No. 4, pp. 23-32 (11 pages).
Official letter from Taiwan Patent Office, (R.O.C.) in Taiwan issued in corresponding application No. 10411621 dated Nov. 12, 2015 [w/English translation] (14 pages).
Taiwan Patent Office (R.O.C.) search report issued in corresponding application No. 10411621 dated Nov. 3, 2015 [w/English translation] (2 pages).
PCT International Search Report and Written Opinion issued in corresponding PCT/US2015/028422 dated Aug. 6, 2015 (10 pages).
Taiwan Divisional Patent Application filed with Taiwan Patent Office (R.O.C.) in corresponding application No. 104138256 on Nov. 19, 2015 (45 pages).
Taiwan office action in corresponding Taiwan application No. 105120180 dated Feb. 2, 2017.
International Search Report and Written Opinion in corresponding PCT application No. PCT/US2015/028422 dated Aug. 6, 2015.
International Preliminary Report on Patentability in corresponding PCT application No. PCT/US2015/028422 dated Nov. 24, 2016.
United States Office Action in corresponding U.S. Appl. No. 14/878,336 dated Feb. 12, 2016.
United States Final Office Action in corresponding U.S. Appl. No. 14/878,336 dated May 5, 2016.
United States Office Action in corresponding U.S. Appl. No. 14/878,336 dated Sep. 16, 2016.
United States Final Office Action in corresponding U.S. Appl. No. 14/878,336 dated Nov. 30, 2016.
United States Office Action in corresponding U.S. Appl. No. 15/212,934 dated Jan. 11, 2017.
Falchetto et al, "Sort Middle Pipeline Architecture for Efficient 3D Rendering", 2007 Digest of Technical Papers International Conference on Consumer Electronics, Jan. 2007.
TW Patent Office issued office action in corresponding divisional TW application No. 104138256 dated May 27, 2016 (9 pages).
W Patent Office issued search report in corresponding divisional TW application No. 104138256 dated May 19, 2016 (2 pages).
Yasuda, T., et al., "A Study of 3D Image Generating Method using Server Rendering", Graduate School of Information Science and Technology, Osaka University (8 pages).
JP office action issued in corresponding JP application No. 2016-561851 dated Dec. 20, 2017 (5 pages).
European Extended Search Report in corresponding EP application No. 15792470.5-1906/3143594 dated Nov. 24, 2017 (9 pages).
Wikipedia contributors: "Bloom filter," Wikipedia: The Free Encyclopedia, Mar. 22, 2014, XP055423856, retrieved from the Internet: URL: https://en.wikipedia.org/w/index.php?title=Bloom_filter &oldid=600744371 [retrieved on Nov. 10, 2017].
Molnar, S., et al., "A sorting classification of parallel rendering," Dec. 10, 2008-Dec. 13, 2008, Dec. 10, 2008-Dec. 13, 2008, pp. 1-11, XP058022820, DOI: 10.1145/1508044.1508079.

* cited by examiner

EXPLOITING FRAME TO FRAME COHERENCY IN A SORT-MIDDLE ARCHITECTURE

BACKGROUND

This relates to graphics processing.

It is common to use a sort-middle architecture for a mobile device. As in any graphics application, it is important to reduce power usage.

Geometry processing may be made parallel by assigning to each processor a subset of the primitives in a scene. Rasterization may be made parallel by assigning to each processor some portion of the necessary pixel calculations. Rendering involves calculating the effect of each primitive on each pixel. A primitive can fall anywhere on or off the actual viewing screen. Rendering sorts the primitives to the screen. The sort can take place during geometry processing in what is called sort-first, between geometry processing and rasterization, called sort-middle, or during rasterization called sort-last. Sort-first means redistributing raw primitives before their screen-space parameters are known, sort-middle means redistributing screen-space primitives, and sort-last means redistributing pixels, samples, or pixel fragments.

BRIEF DESCRIPTION OF THE DRAWINGS

Some embodiments are described with respect to the following figures.

DETAILED DESCRIPTION

Pixel values that were computed in a previous frame may be reused for the current frame, operating in a sort-middle architecture. A hash or some other compact representation of all the data used in a tile, including all triangles, uniforms, textures, shaders, etc. is computed and stored for each tile. When rendering the next frame, that compact representation is once again computed for each tile. In a sort-middle architecture, there is a natural break point just before rasterization. At this break point, the compact representation may be compared to the compact representation computed in the previous frame for the same tile. If those compact representations are the same, then there is no need to render anything for this tile. Instead, the contents of the color buffer or other buffers of the previous frame of the tile may be moved, or otherwise re-used, to the same buffer of the tile for the current frame.

This technique works before rasterization and pixel shading and can be applied to other buffers, in addition to the color buffer.

In a sort-middle architecture, also sometimes called a tiling architecture, the screen is divided into tiles, which are non-overlapping rectangular regions that, together, cover the entire screen. In a first phase, all primitives, such as triangles that are to be rendered, are sorted into the tiles, so that a reference to a primitive is stored in a primitive list per tile for all tiles that the primitive overlaps. When all sorting is done, each tile can be rasterized serially or in parallel.

This technique exploits the fact that often large parts of an image are the same from one image to the next. This effect is often referred to as frame to frame coherency. Frame to frame coherency is exploited here to make the graphics processor more efficient from both a power and performance perspective.

In one embodiment, a compact representation, such as a hash, is accumulated per tile when the primitive list per tile is created. The compact representation may be based on all geometry, input data, and the relevant states, including all primitives, uniforms, textures, shaders, blending modes, etc. The compact representations from the previous frame are stored in memory when rendering the current frame. Then, just before per tile rasterization starts, a determination is made whether the compact representation of the current tile for the current frame is the same as the compact representation of the same tile for the previous frame. If the compact representations are the same, then the rendered content is also assumed to be the same and, consequently, no rendering is needed. Instead, the colors of all the pixels in the tile are reused from the previous frame. If the compact representations are not the same, then rasterization, depth tests, pixel shade, and blend are done as usual.

This technique may be used for all render targets and for depth and stencil as well, in addition to the color buffer. However, for the current render targets, such as the color buffer that will be displayed on the screen, some further optimizations are possible. When using, for example, the embedded display port (eDP) specification versions 1.4/1.5 (and higher), these techniques may be used with partial-frame updates while in the panel soft refresh (PSR) mode. Basically, the algorithm detects that a certain tile for the current frame is the same as the corresponding tile for the previous frame and, hence, rasterization and all subsequent steps are not needed. Therefore, when the data is to be transferred to the display, sending data may be avoided for those tiles that are the same as in the previous frame. Finally, when the frame ends, compact representations for the current frame have to be moved to the previous frame compact representation table and are cleared for future usages. Alternatively, one may only swap the a pointer to the current frame and the previous frame. To avoid memory bursts, a lazy replacement can be considered, adding a single bit to identify the current frame.

The chosen compact representation may comply with one or more of the following criteria: (1) allow processing blocks sequentially, in order to accumulate the overall hash value per tile; (2) minimize false positives, since they could generate visible artifacts; and (3) generate moderately sized hash values, to reduce the storage overhead of the hash table.

Given the fact that the output hash values per tiles are generated just for comparison purposes, any simple cyclic redundancy check or check sum function may suffice, in some embodiments. If a smaller probability of hash collision is desired, even a cryptographic hash function using the Merkle-Damguard construction, such as MD5, may be used at the expense of heavier computation requirements.

In addition, instead of storing a hash, an identifier may be all that is stored for the draw call that fully covered the tile at the end of the frame. If that draw call is static because all uniforms, textures, and shaders, etc. stay the same until the following frame, and it is discovered that the same draw call will cover the tile entirely again, then all processing of that tile may be avoided and the contents from the previous frame reused. For this to work, one could, for example, test if there is a single triangle that overlaps a tile completely, and test if all other triangles in the tile's primitive list are occluded by that triangle. Another way is to determine if a tile is completely covered by a subset of the triangles in a draw call in the current frame, and in the following frame, if the same draw call is exactly the same and all other geometry in that tile are occluded, then nothing needs to be drawn for that tile.

In still another embodiment, a bloom filter may be used instead of a hash. For that implementation, a minimum of two bloom filters may be used, even though two N smaller bloom filters can also be considered. Each pair of bloom filters comprises the elements for different kinds of information. One pair may could be for geometry and another pair may be for texture addresses and a third one may be for shaders, for example. Out of these pairs, one contains the elements for the previous frame and the second one contains the corresponding elements for the current frame.

The bloom filter algorithm works like the one with hashes, in one embodiment. When the triangle list is created, several hash functions are applied to the information to compare. The results of these hash functions are used to index both bloom filters. For the one related to the current frame, all bits indexed are set. On the other hand, for the bloom filter of the previous frame, the bits indexed are read and a check determines whether all of them are one. If so, the rendered content is assumed to be the same and the colors are reused from the previous frame. If not, the sequence proceeds normally. Once the frame finishes, the usage of the bloom filters swaps. The one pointing to the current frame becomes the previous frame, and the former previous frame is cleared.

One advantage of using bloom filters compared to a hash is that, usually, bloom filters require less storage space to keep all the information, although they may require extra logic for the multiple hash functions. Traditionally, the number of bits required to get a false positive ratio of about 0.5 percent is in the range of eleven to twelve bits per element in the bloom filter and the optimal number of hash functions for this false positive ratio is in the range of six to eight functions.

Figure 1:
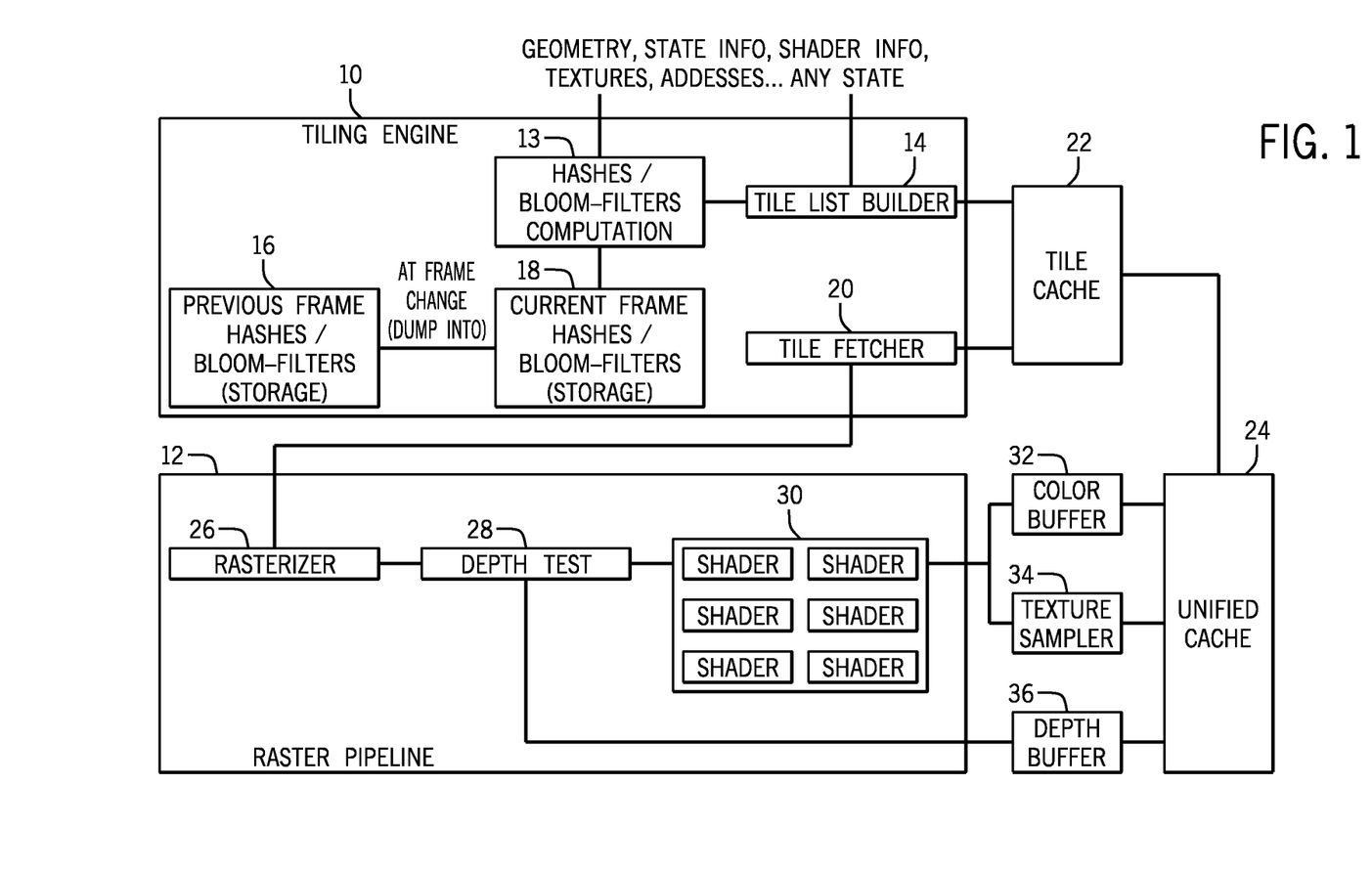
FIG. 1 is a schematic depiction for one embodiment.

Referring to FIG. 1, the tiling engine 10 may be coupled to a raster pipeline 12. The tiling engine 10 receives geometry, state information, shader information, and texture addresses in a hash or bloom filter computation unit 13. Any state information is provided to a tile list builder 14 that combines the pipeline result with any state information. This combined data is stored in the tile cache 22.

The previous frame hashes or bloom filter storage 16 is dumped into the current frame hashes/bloom filter storage 18 at frame change. A tile fetcher 20 fetches tiles from the rasterization pipeline 12 and provides them to a tile cache 22. The tile cache 22 transfers data to the unified cache 24.

The raster pipeline 12 includes a rasterizer 26 coupled to the tile fetcher 20 and a depth test unit 28. A plurality of shaders may be coupled to the depth test unit 28. The shaders 30 are coupled to a color buffer 32, a texture sampler 34, and a depth buffer 36, which, in turn, are coupled to the unified cache 24.

Figure 2:
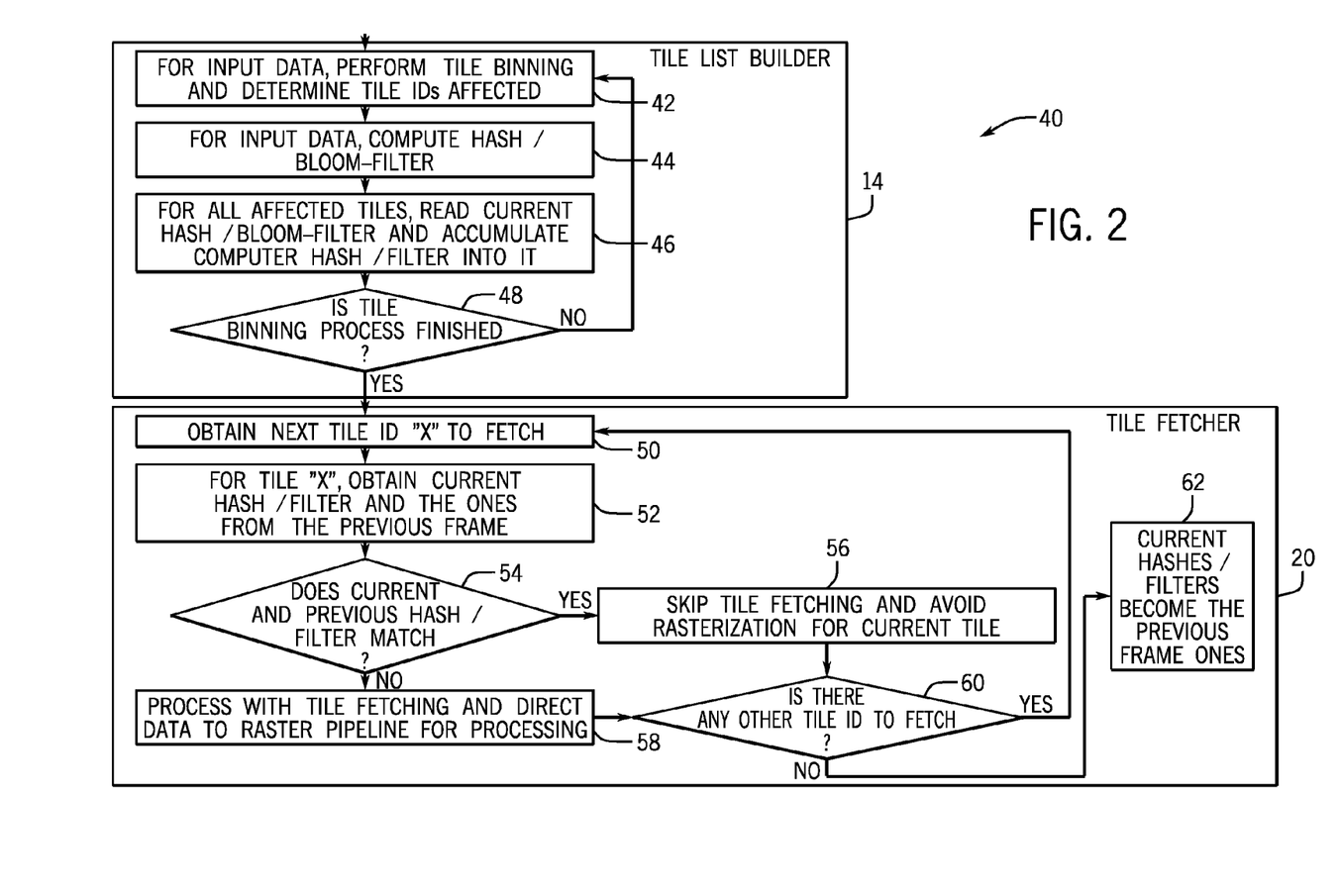
FIG. 2 is a flow chart for one embodiment.

A sequence 40, shown in FIG. 2, may be implemented in software, firmware and/or hardware. In software and firmware embodiments, it may be implemented by computer executed instructions stored in one or more non-transitory computer readable medium, such as magnetic, optical, or semiconductor storage.

The sequence begins in the tile list builder 14, which performs tile binning and also determines the tile identifiers that are affected for the input data, as indicated in block 42. Then, the hash or bloom filter is computed for the input data in block 44. For all affected tiles, the current hash or Bloom filter is read and the computed hash or filter is accumulated, as indicated in block 46. Then, a check at diamond 48 determines whether the tile binning process is finished. If not, the flow iterates back to block 42. If so, the flow proceeds to tile fetcher 20.

In block 50, the next tile identifier to fetch is obtained. For that tile, the current hash or filter is obtained and the ones from the previous frame are obtained in block 52. A check at 54 determines whether the current and previous hash or filters match. If so, at 56, tile fetching is skipped and rasterization may be avoided for the current tile. If not, at 58, proceed with tile fetching and direct data to raster pipeline for processing. Then, at 60, it is determined if there is any other tile identifier to fetch. If so, the flow iterates back to block 50. Otherwise, at 62, the current hashes or filter values become the previous hashes or filter values.

Figure 3:
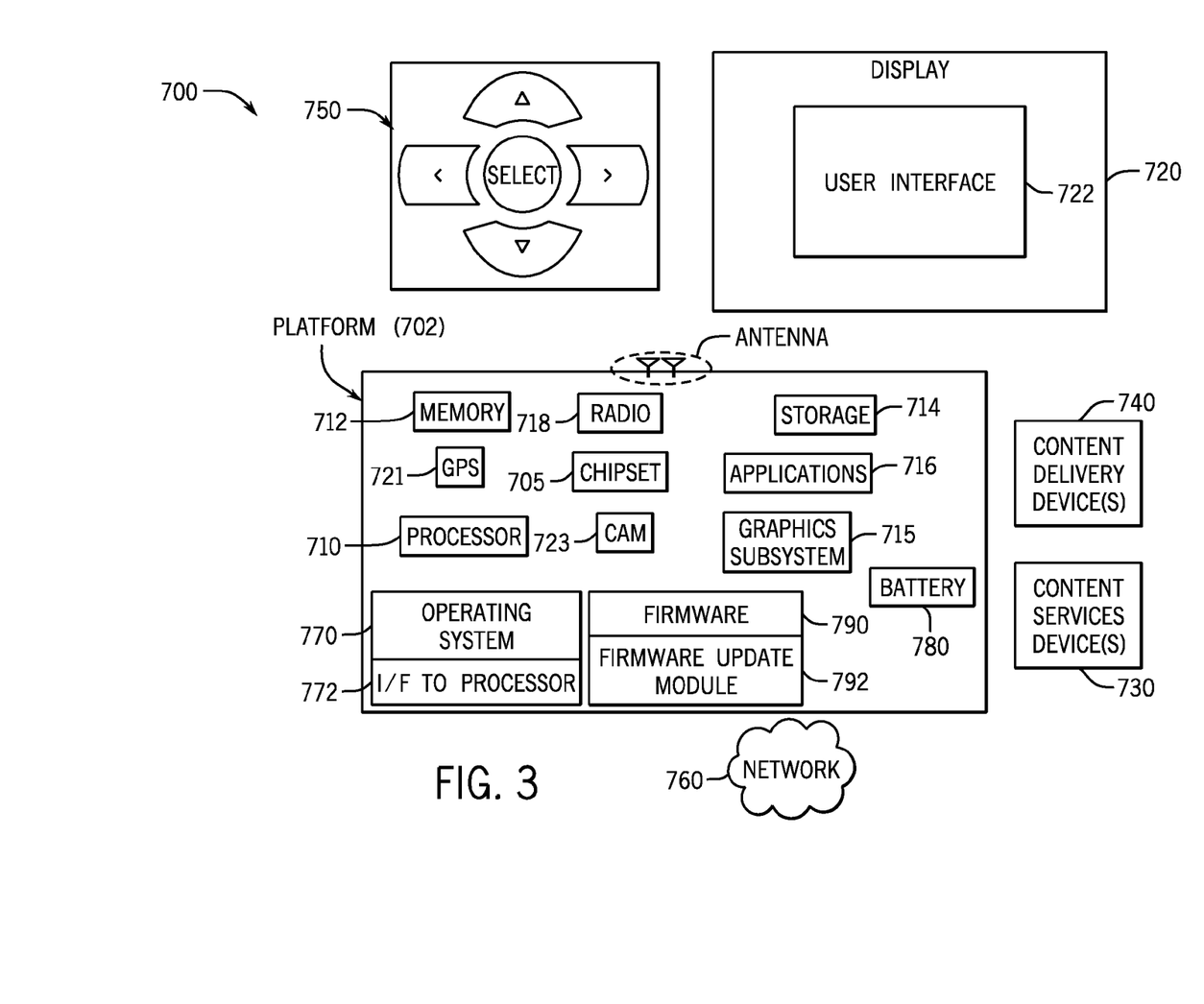
FIG. 3 is a system depiction for one embodiment.

FIG. 3 illustrates an embodiment of a system 700. In embodiments, system 700 may be a media system although system 700 is not limited to this context. For example, system 700 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In embodiments, system 700 comprises a platform 702 coupled to a display 720. Platform 702 may receive content from a content device such as content services device(s) 730 or content delivery device(s) 740 or other similar content sources. A navigation controller 750 comprising one or more navigation features may be used to interact with, for example, platform 702 and/or display 720. Each of these components is described in more detail below.

In embodiments, platform 702 may comprise any combination of a chipset 705, processor 710, memory 712, storage 714, graphics subsystem 715, applications 716 and/or radio 718. Chipset 705 may provide intercommunication among processor 710, memory 712, storage 714, graphics subsystem 715, applications 716 and/or radio 718. For example, chipset 705 may include a storage adapter (not depicted) capable of providing intercommunication with storage 714.

Processor 710 may be implemented as Complex Instruction Set Computer (CISC) or Reduced Instruction Set Computer (RISC) processors, x86 instruction set compatible processors, multi-core, or any other microprocessor or central processing unit (CPU). In embodiments, processor 710 may comprise dual-core processor(s), dual-core mobile processor(s), and so forth. The processor may implement the sequence of FIG. 2 together with memory 712.

Memory 712 may be implemented as a volatile memory device such as, but not limited to, a Random Access Memory (RAM), Dynamic Random Access Memory (DRAM), or Static RAM (SRAM).

Storage 714 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 714 may comprise technology to increase the storage performance enhanced protection for valuable digital media when multiple hard drives are included, for example.

Graphics subsystem 715 may perform processing of images such as still or video for display. Graphics subsystem 715 may be a graphics processing unit (GPU) or a visual processing unit (VPU), for example. An analog or digital interface may be used to communicatively couple graphics subsystem 715 and display 720. For example, the interface may be any of a High-Definition Multimedia Interface, DisplayPort, wireless HDMI, and/or wireless HD compliant techniques. Graphics subsystem 715 could be integrated into processor 710 or chipset 705. Graphics subsystem 715 could be a stand-alone card communicatively coupled to chipset 705.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

Radio 718 may include one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, radio 718 may operate in accordance with one or more applicable standards in any version.

In embodiments, display 720 may comprise any television type monitor or display. Display 720 may comprise, for example, a computer display screen, touch screen display, video monitor, television-like device, and/or a television. Display 720 may be digital and/or analog. In embodiments, display 720 may be a holographic display. Also, display 720 may be a transparent surface that may receive a visual projection. Such projections may convey various forms of information, images, and/or objects. For example, such projections may be a visual overlay for a mobile augmented reality (MAR) application. Under the control of one or more software applications 716, platform 702 may display user interface 722 on display 720.

In embodiments, content services device(s) 730 may be hosted by any national, international and/or independent service and thus accessible to platform 702 via the Internet, for example. Content services device(s) 730 may be coupled to platform 702 and/or to display 720. Platform 702 and/or content services device(s) 730 may be coupled to a network 760 to communicate (e.g., send and/or receive) media information to and from network 760. Content delivery device(s) 740 also may be coupled to platform 702 and/or to display 720.

In embodiments, content services device(s) 730 may comprise a cable television box, personal computer, network, telephone, Internet enabled devices or appliance capable of delivering digital information and/or content, and any other similar device capable of unidirectionally or bidirectionally communicating content between content providers and platform 702 and/display 720, via network 760 or directly. It will be appreciated that the content may be communicated unidirectionally and/or bidirectionally to and from any one of the components in system 700 and a content provider via network 760. Examples of content may include any media information including, for example, video, music, medical and gaming information, and so forth.

Content services device(s) 730 receives content such as cable television programming including media information, digital information, and/or other content. Examples of content providers may include any cable or satellite television or radio or Internet content providers. The provided examples are not meant to limit the applicable embodiments.

In embodiments, platform 702 may receive control signals from navigation controller 750 having one or more navigation features. The navigation features of controller 750 may be used to interact with user interface 722, for example. In embodiments, navigation controller 750 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 750 may be echoed on a display (e.g., display 720) by movements of a pointer, cursor, focus ring, or other visual indicators displayed on the display. For example, under the control of software applications 716, the navigation features located on navigation controller 750 may be mapped to virtual navigation features displayed on user interface 722, for example. In embodiments, controller 750 may not be a separate component but integrated into platform 702 and/or display 720. Embodiments, however, are not limited to the elements or in the context shown or described herein.

In embodiments, drivers (not shown) may comprise technology to enable users to instantly turn on and off platform 702 like a television with the touch of a button after initial boot-up, when enabled, for example. Program logic may allow platform 702 to stream content to media adaptors or other content services device(s) 730 or content delivery device(s) 740 when the platform is turned "off." In addition, chip set 705 may comprise hardware and/or software support for 5.1 surround sound audio and/or high definition 7.1 surround sound audio, for example. Drivers may include a graphics driver for integrated graphics platforms. In embodiments, the graphics driver may comprise a peripheral component interconnect (PCI) Express graphics card.

In various embodiments, any one or more of the components shown in system 700 may be integrated. For example, platform 702 and content services device(s) 730 may be integrated, or platform 702 and content delivery device(s) 740 may be integrated, or platform 702, content services device(s) 730, and content delivery device(s) 740 may be integrated, for example. In various embodiments, platform 702 and display 720 may be an integrated unit. Display 720 and content service device(s) 730 may be integrated, or display 720 and content delivery device(s) 740 may be integrated, for example. These examples are not meant to be scope limiting.

In various embodiments, system 700 may be implemented as a wireless system, a wired system, or a combination of both. When implemented as a wireless system, system 700 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 700 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 702 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 3.

Figure 4:
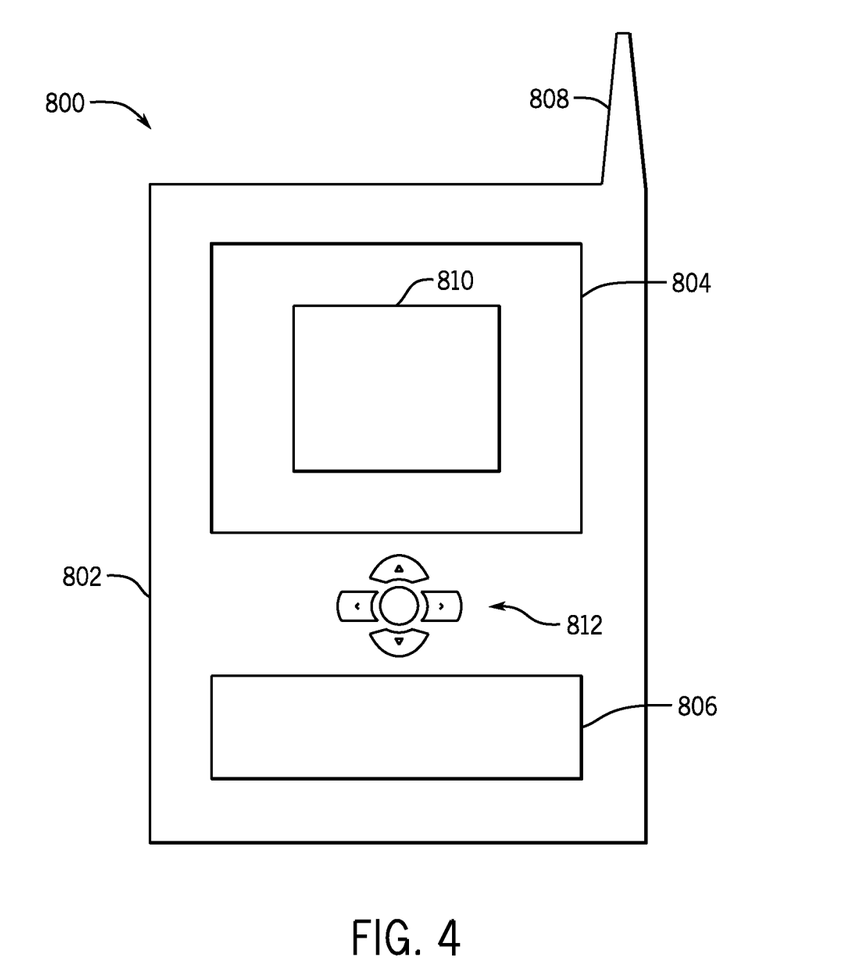
FIG. 4 is a front elevational view for one embodiment.

As described above, system 700 may be embodied in varying physical styles or form factors. FIG. 4 illustrates embodiments of a small form factor device 800 in which system 700 may be embodied. In embodiments, for example, device 800 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

The following clauses and/or examples pertain to further embodiments:

One example embodiment may be a method comprising accumulating a reduced representation of geometry, input data, and state for tile when a triangle list is created, before per tile rasterization, determining whether the representation for the current tile in the current frame is the same as the representation for the previous frame and the corresponding tile, and if the representations for the tile in previous and current frames are the same, then reusing the prior tile's pixels as the current tile's pixels when rendering the current tile. The method may include using a hash function to produce the reduced representation. The method may include using a bloom filter to produce the reduced representation. The method may include using two bloom filters, one for the current tile and one for a previous tile. The method may include using one pair of bloom filters for each of geometry, texture addresses, and shaders. The method may include accumulating in a sort-middle architecture. The method may include wherein reusing includes reusing the color values. The method may include wherein reusing includes reusing depth or stencil buffers. The method may include changing the current compact representation to the previous compact representation. The method may include determining if the same draw call is used for the same tile in successive frames to determine if the representations are the same.

Another example embodiment may be one or more non-transitory computer readable media storing instructions to implement a sequence comprising accumulating a reduced representation of geometry, input data, and state for tile when a triangle list is created, before per tile rasterization, determining whether the representation for the current tile in the current frame is the same as the representation for the previous frame and the corresponding tile, and if the representations for the tile in previous and current frames are the same, then reusing the prior tile's pixels as the current tile's pixels when rendering the current tile. The media may include said sequence including using a hash function to produce the reduced representation. The media may include said sequence including using a bloom filter to produce the reduced representation. The media may include said sequence including using two bloom filters, one for the current tile and one for a previous tile. The media may include said sequence including using one pair of bloom filters for each of geometry, texture addresses, and shaders. The media may include said sequence including accumulating in a sort-middle architecture. The media may wherein reusing includes reusing the color values. The media may wherein reusing includes reusing depth or stencil buffers. The media may include said sequence including determining if the same draw call is used for the same tile in successive frames to determine if the representations are the same.

In another example embodiment may be an apparatus comprising a processor to accumulate a reduced representation of geometry, input data, and state for tile when a triangle list is created, before per tile rasterization, determine whether the representation for the current tile in the current frame is the same as the representation for the previous frame and the corresponding tile, and if the representations for the tile in previous and current frames are the same, then reuse the prior tile's pixels as the current tile's pixels when rendering the current tile, and a storage coupled to said processor. The apparatus may include said processor to use a hash function to produce the reduced representation. The apparatus may include a bloom filter to produce the reduced representation. The apparatus may include two bloom filters, one for the current tile and one for a previous tile. The apparatus may include one pair of bloom filters for each of geometry, texture addresses, and shaders. The apparatus may include said processor to accumulate in a sort-middle architecture. The apparatus may include said processor to refrain from sending data for display when the compact representations are the same. The apparatus may include said processor to determine if the same draw call is used for the same tile in successive frames to determine if the representations are the same. The apparatus may include a battery. The apparatus may include firmware and a module to update said firmware.

The graphics processing techniques described herein may be implemented in various hardware architectures. For example, graphics functionality may be integrated within a chipset. Alternatively, a discrete graphics processor may be used. As still another embodiment, the graphics functions may be implemented by a general purpose processor, including a multicore processor.

References throughout this specification to "one embodiment" or "an embodiment" mean that a particular feature, structure, or characteristic described in connection with the embodiment is included in at least one implementation encompassed within the present disclosure. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While a limited number of embodiments have been described, those skilled in the art will appreciate numerous modifications and variations therefrom. It is intended that the appended claims cover all such modifications and variations as fall within the true spirit and scope of this disclosure.

What is claimed is:

1. A method comprising:
    accumulating a reduced representation of geometry, input data, and state for a tile when a primitive list is created;
    before per tile rasterization, determining whether the reduced representation for the current tile in the current frame is the same as the reduced representation of a corresponding tile in the previous frame by testing if there is a single primitive that overlays the tile completely and whether all other primitives in the primitive list are occluded by that primitive in the primitive list; and
    if so, then reusing pixels from the tile in the previous frame as pixels for the tile in the current frame when rendering the current tile.

2. The method of claim 1 including using a hash function to produce the reduced representation.

3. The method of claim 1 including using a bloom filter to produce the reduced representation.

4. The method of claim 3 including using two bloom filters, one for the current tile and one for a previous tile.

5. The method of claim 4 including using one pair of bloom filters for each of geometry, texture addresses, and shaders.

6. The method of claim 4 wherein after processing the current frame, using the bloom filter for the current as the bloom filter for the prior frame and obtaining and using the bloom filter for the previous frame as a bloom filter for the next frame.

7. The method of claim 1 including accumulating in a sort-middle architecture.

8. The method of claim 1 wherein reusing includes reusing the color values.

9. The method of claim 1 wherein reusing includes reusing depth or stencil buffers.

10. The method of claim 1 including refraining from sending data for display when the compact representations are the same.

11. The method of claim 1 including changing the current compact representation to the previous compact representation.

12. The method of claim 1 including a draw call associated with a tile in a first frame, a draw call associated with a corresponding tile in a second frame, and determining if the same draw call is used for the same tile in successive frames to determine if the reduced representations are the same.

13. One or more non-transitory computer readable media storing instructions to implement a sequence comprising:
    accumulating a reduced representation of geometry, input data, and state for a tile when a triangle list is created;
    before per tile rasterization, determining whether the reduced representation for the current tile in the current frame is the same as the reduced representation of a corresponding tile in the previous frame by testing if there is a single primitive that overlays the tile completely and whether all other primitives in the primitive list are occluded by that primitive in the primitive list; and
    if so, then reusing pixels from the tile in the previous frame as pixels for the tile in the current frame when rendering the current tile.

14. The media of claim 13, said sequence including using a hash function to produce the reduced representation.

15. The media of claim 13, said sequence including using a bloom filter to produce the reduced representation.

16. The media of claim 15, said sequence including using two bloom filters, one for the current tile and one for a previous tile.

17. The media of claim 16, said sequence including using one pair of bloom filters for each of geometry, texture addresses, and shaders.

18. The media of claim 13, said sequence including accumulating in a sort-middle architecture.

19. The media of claim 13 wherein reusing includes reusing the color values.

20. The media of claim 13 wherein reusing includes reusing depth or stencil buffers.

21. The media of claim 13, including a draw call associated with a tile in a first frame, a draw call associated with a corresponding tile in a second frame, and said sequence including determining if the same draw call is used for the same tile in successive frames to determine if the reduced representations are the same.

22. The media of claim 13, said sequence including wherein after processing the current frame, using the bloom filter for the current as the bloom filter for the prior frame and obtaining and using the bloom filter for the previous frame as a bloom filter for the next frame.

23. An apparatus comprising:
    a processor to accumulate a reduced representation of geometry, input data, and state for a tile when a triangle list is created, before per tile rasterization, determine whether the reduced representation for the current tile in the current frame is the same as the reduced representation of a corresponding tile in the previous frame by testing if there is a single primitive that overlays the tile completely and whether all other primitives in the primitive list are occluded by that primitive in the primitive list, and
    if so, then reuse pixels from the tile in the previous frame as pixels for the tile in the current frame when rendering the current tile; and
    a storage coupled to said processor.

24. The apparatus of claim 23, said processor to use a hash function to produce the reduced representation.

25. The apparatus of claim 23, including a bloom filter to produce the reduced representation.

26. The apparatus of claim 25 including two bloom filters, one for the current tile and one for a previous tile.

27. The apparatus of claim 26 including one pair of bloom filters for each of geometry, texture addresses, and shaders.

28. The apparatus of claim 23, said processor to accumulate in a sort-middle architecture.

29. The apparatus of claim 23, said processor to refrain from sending data for display when the compact representations are the same.

30. The apparatus of claim 23, including a draw call associated with a tile in a first frame, a draw call associated with a corresponding tile in a second frame, said processor to determine if the same draw call is used for the same tile in successive frames to determine if the reduced representations are the same.

31. The apparatus of claim 23 including a battery.

32. The apparatus of claim 23, said processor to process the current frame, use the bloom filter for the current as the bloom filter for the prior frame and obtain and use the bloom filter for the previous frame as a bloom filter for the next frame.

* * * * *